United States Patent [19]

Repsher et al.

[11] 4,291,001
[45] Sep. 22, 1981

[54] RECOVERY OF LITHIUM FROM BRINE

[75] Inventors: Wendy J. Repsher, Lake Jackson; Kirby T. Rapstein, Brazoria, both of Tex.

[73] Assignee: The Dow Chemical Company, Midland, Mich.

[21] Appl. No.: 106,961

[22] Filed: Dec. 26, 1979

[51] Int. Cl.$^3$ .............................................. C01D 15/00
[52] U.S. Cl. ................................ 423/179.5; 423/157; 423/181
[58] Field of Search ..................... 423/157, 179.5, 181

[56] References Cited
U.S. PATENT DOCUMENTS 4,116,856  9/1978  Lee et al. ........................ 423/179.5
4,116,858  9/1978  Lee et al. ........................ 423/179.5

Primary Examiner—O. R. Vertiz
Assistant Examiner—Wayne A. Langel
Attorney, Agent, or Firm—W. J. Lee

[57] ABSTRACT

Improvements are made in the process wherein Li+ values are recovered from dilute aqueous solution by the use of an anion exchange resin composite containing crystalline LiX.2Al(OH)$_3$, where X is halide. The improvements derive from enriching the Li+ containing solution with a non-competing metal salt (e.g., NaCl) prior to the Li+ removal, thereby achieving higher Li+ loading of the resin composite and obtaining more concentrated eluates.

10 Claims, 1 Drawing Figure

4,291,001

RECOVERY OF LITHIUM FROM BRINE

BACKGROUND OF THE INVENTION

U.S. Pat. Nos. 4,116,856; 4,116,858; and 4,159,311 disclose the in-situ formation of hydrous alumina, by ammonia precipitation of Al halide, within anion exchange resins, followed by reaction of the hydrous alumina with Li halide to form crystalline LiX.2Al(OH)$_3$, where X is halide. Such resin/aluminate composites are disclosed as being useful in recovering Li$^+$ values from Li$^+$-containing aqueous solutions.

It is also known that the amount of such hydrous alumina that can be thus precipitated in a weak-base anion exchange resin can be increased by subsequent additional application of Al halide, followed by the ammonia precipitation, so long as the weak-base resin is converted back to its halide salt form under mildly acid conditions (e.g., pH 5–6.5) before such additional application of Al halide. Maximum loading of hydrous alumina is approached by repeated precipitation steps.

SUMMARY OF THE INVENTION

In a process for recovering Li$^+$ values from a Li$^+$-containing aqueous solution by contacting said solution with an anion exchange resin composite containing crystalline LiX.2Al(OH)$_3$ dispersed therein (where X is halide), the improvement which comprises loading the said aqueous solution with a non-competing soluble metal salt (e.g., Na halide) before contacting said solution with said resin composite, thereby achieving higher Li$^+$ loading of the resin composite and obtaining more concentrated eluates.

DETAILED DESCRIPTION OF THE INVENTION

Figure 1:
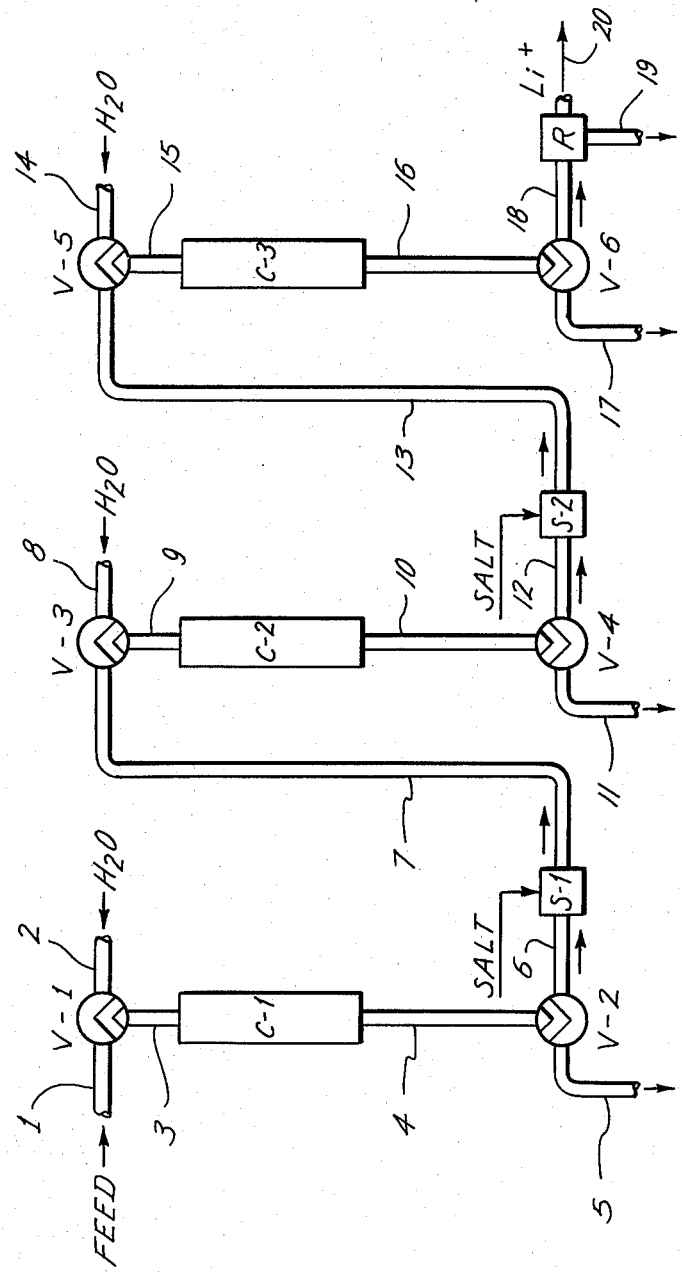

FIG. 1 is a depiction, not-to-scale, of a flow sheet to serve as a visual aid in describing certain embodiments of the present invention.

The teachings of Bauman and Lee in U.S. Pat. Nos. 4,116,856; 4,116,858; and 4,159,311 are incorporated herein by reference. Stated briefly, the patents disclose that aqueous Al halide is reacted with aqueous ammonia in situ within the reticules of macroporous anion exchange resins, thereby forming hydrous alumina (e.g., Al(OH)$_3$) dispersed in said resin. The hydrous alumina is caused to react, at elevated temperature, with Li halide to form crystalline LiX.2Al(OH)$_3$ in the resin (where X is halide). The so-formed composite is useful in selectively removing Li$^+$ values from Li$^+$-brines. The resin composite, when loaded with Li$^+$, is eluted with an aqueous wash in such a manner that not all the LiX is removed; the resin composite is thus made ready for further removal of Li$^+$ from brine. The Li$^+$-containing aqueous wash contains the desired Li$^+$ values.

In pending application Ser. No. 095,691, filed Nov. 19, 1979, by Bauman and Lee, it is disclosed that greater amounts of hydrous alumina can be incorporated into a resin having weak-base exchange groups if the composite is acidified to its halide form at not lower than pH 5, then adding more Al halide to the resin and precipitating further quantities of hydrous alumina by addition of aqueous ammonia. In this manner, it is possible to maximize the amount of hydrous alumina in the resin, thus one may subsequently maximize the amount of LiX.2Al(OH)$_3$ in the resin.

It is the above-described resin/aluminate composites to which the present invention pertains, especially those in which the amount of aluminate (i.e., LiX.2Al(OH)$_3$) has been maximized.

In large scale operation, where all the expense of moving and handling materials must be taken into account, along with the solution concentrations, there exists a need to develop the process to the point at which greater economic efficiency is realized.

We have discovered that a Li$^+$-containing aqueous solution can be concentrated by the steps which, in general, comprise (1) substantially loading the said solution with a non-competing metal salt, e.g., Na halide, (2) passing the solution through the resin/aluminate composite to selectively remove Li$^+$ values, and (3) eluting the Li$^+$ values from the resin/aluminate composite with water to form a Li$^+$-containing aqueous solution which is richer in Li$^+$ values than the beginning solution.

As used herein, the expression "loading" implies that an appreciable amount of the subject material is incorporated into the subject medium. Preferably the amount loaded is an amount sufficient to substantially saturate the subject medium. When loading non-competing metal salts into Li$^+$-containing aqueous solutions, the amount of metal salt should be at least as much as the amount of Li compound, but is preferably an amount sufficient to substantially saturate the aqueous solution. When loading Li$^+$ values (e.g., LiCl) into the resin-/aluminate composite, maximum economics are approached by substantially saturating the exchange sites.

In this disclosure, the expression "resin/aluminate composite" refers to anion exchange resins having dispersed therein crystalline LiX.2Al(OH)$_3$ such as reported by Bauman and Lee referred to supra.

The expression "non-competing metal salts" refers to water-soluble metal salts which do not substantially interfere with the ability of the resin/aluminate composite to selectively remove Li$^+$ values from aqueous solutions. Of the metals, those which are known as alkali metals and alkaline earth metals are of greatest interest. The salt moieties of greatest interest are the halides, e.g., chlorides, bromides, or iodides, with the chlorides being most preferred. Generally, when one has the option of selecting any available metal salt the obvious choice, because of easy availability and low cost, is NaCl, especially when the Li compound is LiCl. In some cases other brines, such as MgCl$_2$, CaCl$_2$, or KCl may be conveniently employed.

The Li$^+$-containing aqueous solution with which one starts may already contain amounts of non-competing soluble metal salts. If the amounts are relatively small, then improvements are found, according to the present invention, by increasing the amount, preferably to saturation. When one uses the resin/aluminate composite to remove Li$^+$ values from an aqueous brine solution, then uses water to elute Li$^+$ values from the composite, one obtains a relatively dilute Li$^+$-containing eluate which one may desire to concentrate. Such concentration may be achieved in accordance with the present invention by adding a substantial amount of non-competing metal salt (e.g., NaCl) to the relatively dilute Li$^+$-containing eluate, then again using a resin/aluminate composite to remove Li$^+$ values from the solution. Then when the Li$^+$ values are eluted from the composite with a water wash, the new eluate contains greater concentration of Li$^+$ than the previous eluate.

The Li$^+$-containing aqueous solution may be a naturally-occurring Li$^+$-containing brine such as found in or around Arkansas, Michigan, Nevada, California, the Dead Sea, the Middle East, or South America. Other sources of Li+ containing solutions may come from ore leachings or by-product streams of chemical processes. Many of such solutions already contain other metal salts, e.g., NaCl, $MgCl_2$, $CaCl_2$, etc.

FIG. 1 is a depiction of a flow sheet, not drawn to scale, to serve as a visual aid in describing various embodiments of the present invention. In FIG. 1 there is shown a plurality of vessels (preferably columns) designated as C-1, C-2, and C-3 which contain the resin/aluminate composite. It is not necessary that a plurality of such vessels be used, but it is generally best for efficient operation to perform a first Li+ removal in one column, then take the wash cycle eluate from that column, add a non-competing metal salt to it, then flow the solution through a second column to once again remove Li+ values; a water wash of the second column then provides an eluate which is richer in Li+ values than the first. Additional benefits are derived in some cases by repeating the salt incorporation step and performing the Li+ removal in a third column. It will be understood by skilled artisans that instead of using a plurality of such columns, one may use only one column and by proper control of the liquid streams, perform the various steps a plurality of times.

Generally if one has a relatively concentrated solution from which appreciable quantities of Li compounds can be removed by standard methods, such as by $CO_2$ precipitation of lithium carbonate and filtration, there is no need for using the resin/aluminate composite removal step. After such ordinary removal of Li compounds, there usually still remains a small concentration of Li+ values in solution and this weak solution is beneficially contacted with the resin/aluminate composite in accordance with the present invention. If one has a relatively strong solution of Li compounds, but the solution also contains other compounds which interfere with customary separation methods so as to preclude the obtaining of relatively pure Li compounds, then separation by way of the resin/aluminate composite is recommended.

GENERAL DESCRIPTION OF MULTI-STEP METHOD

Referring to FIG. 1, there are shown flow means numbered 1 through 20, flow control means (valves) numbered V-1 through V-6, salt-incorporators S-1 and S-2, and Li+ removal means R, in operable combination with vessels (columns) C-1, C-2, and C-3.

The valve means depicted are conveniently (but not necessarily) of the type which can divert flow first along one route and then, when turned, along another route. Other means for controlling the flows may be used.

An aqueous solution of Li compound, e.g., LiCl, which is substantially loaded with a non-competing metal salt, e.g., NaCl, is employed as the feed material through flow means (1), valve means (V-1), flow means (3), and through a column (C-1) which contains the resin/aluminate composite. The solution coming out through flow means (4) is monitored to determine Li+ break-through which occurs after the composite becomes loaded with Li+. The flow is continued through valve means (V-2) and out through flow means (5) during Li+-loading of the composite.

After the composite is loaded, or at least substantially loaded, with Li+ values, a water-wash (preferably containing a very small concentration of Li+) is passed through flow means (2), valve means (V-1) and flow means (3) and through the composite to push out the remaining feed and to elute Li+ values from the composite. The reason that it is preferred to employ a very small amount of Li+ in the water-wash is to assure that the $LiX.2Al(OH)_3$ is not totally stripped of Li+, thus preserving the crystalline aluminate structure. When the wash-water has pushed the remaining feed solution from the composite, valve means (V-2) is operated to direct the Li+-containing eluate to flow means (6).

The eluate through flow means (6) is enriched, preferably substantially saturated, with a non-competing melt salt by salt-incorporation (S-1) thereby becoming a feed stream through flow means (7), through valve means (V-3) and flow means (9) into a column (C-2). In column (C-2) the Li+ values are taken up by the resin/aluminate composite and the remaining solution flows through flow means (10), valve means (V-4) and out through flow means (11). When the composite in column (C-2) is substantially loaded with Li+ values, the flow of feed is stopped and flow of wash-water is begun through flow means (8), valve means (V-3) and flow means (9). When the feed solution has been pushed out of column (C-2) by the wash-water, the flow through flow means (10) is diverted to flow means (12). At this point the eluate is richer in Li+ values than was the previous eluate from column (C-1). The eluate in flow means (12) may be collected as is for further treatment elsewhere or may be re-loaded with salt (S-2) to become feed for a subsequent resin/aluminate composite treatment such as by repeating in column (C-3) the same flow cycles done in column (C-1) and/or (C-2).

When it has been decided that the Li+-containing eluate, whether it comes from column (C-1), column (C-2), or column (C-3), has a sufficient concentration of Li+ values for the desired purpose then one may not benefit substantially from additional concentration cycles in the resin/aluminate composite. However, if the Li+ values are substantially removed from the solution by some other means, any remaining dilute solution of Li compounds may be recycled back into the process of the present invention. Thus, the flow from flow means (19), and for that matter from flow means (5), flow means (11), or flow means (17), may be recycled back into the process. It is within the purview of the present invention to use the flow from flow means (5), flow means (11), and/or flow means (17) as a source of salt into salt-incorporator (S-1) and/or salt-incorporator (S-2).

It is also within the purview of the present invention to provide hold-up tanks, surge vessels, re-cycle flows, and flow diverters as needed to accomodate variances in the process and to provide for diluters and/or concentrators in the process. An ideal location in the process for installing a hold-up tank would be, e.g., at the point at which salt-incorporation is desired. Furthermore, operation of the columns, flow means, salt-incorporators, etc. may be done in tandem or in parallel manner wherein effluents from one train may be at least partially incorporated as influents to another train.

For best operation, the present process should be operated at temperatures generally within the range of about 15° C. to about 108° C., preferably within the range of about 60° C. to about reflux temperature. Due consideration should be given to the unwanted possibility of having metal salts precipitate within the resin/aluminate composite by way of being cooled (or evaporated) below the point of supersaturation within the column.

The flows through the resin composite bed may be co-current or counter-current and may be upward, downward, or horizontal. The preferred manner is to flow the feed and the wash-water downwardly through the bed because of density differences in the streams.

The following examples are to illustrate certain embodiments, but the present invention is not limited to the particular embodiments illustrated.

EXAMPLE 1

(Comparative example to illustrate prior art)

A macroporous anion exchange resin containing weak-base groups, sold commercially as DOWEX-MWA-1 (a tradename of The Dow Chemical Company), is loaded with hydrous alumina by repeated impregnations of the resin with $AlCl_3$ at mildly acid conditions (the HCl treatment of the resin being not lower than pH 5), with precipitation of hydrous alumina by addition of aqueous ammonia following each $AlCl_3$ impregnation. Then the hydrous alumina dispersed within the resin beads is converted to $LiCl.2Al(OH)_3$ by contacting it at elevated temperature with LiCl in accordance with the method shown in U.S. Pat. No. 4,116,856 and U.S. Pat. No. 4,116,858. The resin/aluminate composite, containing more than 3 millimoles of Al per cubic centimeter of resin is employed as below.

A portion of the resin composite (120 cc) is placed in a jacketed column, temperature-controlled at about 93° C., and a $Li^+$-containing natural brine (known as Smackover brine from Arkansas, containing about 0.15% LiCl and substantially saturated with NaCl and $CaCl_2$) is passed through the column (downwardly) at a flow rate of 20 cc/min. until the effluent $Li^+$ concentration is about equal to that of the influent; this indicates that the resin is "loaded" with LiCl and is not removing more LiCl from the brine.

Elution is carried out using water containing 80 ppm $Li^+$ which is passed downwardly through the column at 3 cc/min. The effluent is collected, the first cut being 40 cc, the second cut being 25 cc, and all remaining cuts being 5 cc. The product cuts are analyzed for lithium using an atomic spectrophotometer and are shown below (as % LiCl):

| Cut # | % LiCl | Cut # | % LiCl |
|---|---|---|---|
| 5 | 0.17 | 10 | 2.89 |
| 6 | 1.17 | 11 | 2.30 |
| 7 | 3.42 | 12 | 1.96 |
| 8 | 4.15 | 13 | 1.70 |
| 9 | 3.54 | 14 | 1.24 |

Mixing cuts 7-12, inclusive, results in a solution containing 3.04% LiCl.

EXAMPLE 2

An approximately 3% LiCl solution is combined with an amount of NaCl in excess of the amount required for saturation, is filtered to remove undissolved NaCl, and upon analysis is found to contain 1.83% LiCl.

Smackover brine (as in Example 1) is passed downwardly through the resin bed at 20 cc/min. until effluent $Li^+$ concentration is the same as that of the influent. The 1.83% LiCl solution prepared above is passed downwardly through the column at 3 cc/min. until the effluent $Li^+$ concentration is the same as that of the influent. Elution is performed in the same size cuts and same flow rate as in Example 1 above and analysis of cuts 5-14 are as shown below:

| Cut # | % LiCl | Cut # | % LiCl |
|---|---|---|---|
| 5 | 1.96 | 10 | 4.81 |
| 6 | 2.57 | 11 | 3.53 |
| 7 | 4.15 | 12 | 2.73 |
| 8 | 5.70 | 13 | 2.36 |
| 9 | 5.95 | 14 | 2.02 |

Mixing cuts 7-12, inclusive, results in a solution containing 4.48% LiCl, which is a 47% increase in the LiCl concentration over that obtained in Example 1 above.

EXAMPLE 3

Example 2 is repeated except that only 20 cc of the 1.83% LiCl solution is passed into the resin bed before eluting with 8° ppm $Li^+$ water. Elution cuts are taken as in the above Examples and analysis is made on cuts 9-18 as follows:

| Cut # | % LiCl | Cut # | % LiCl |
|---|---|---|---|
| 9 | 0.58 | 14 | 3.84 |
| 10 | 1.63 | 15 | 3.04 |
| 11 | 3.77 | 16 | 2.48 |
| 12 | 4.98 | 17 | 2.12 |
| 13 | 4.65 | 18 | 1.80 |

Mixing cuts 11-16, inclusive, results in a solution containing 3.79% LiCl, which is a 25% increase in the LiCl concentration over that obtained in Example 1 above.

We claim:

1. In a process for removing $Li^+$ values from a $Li^+$-containing aqueous solution by passing the solution through a resin/aluminate composite,
    wherein said $Li^+$-containing aqueous solution is one which is not substantially loaded with non-competing metal salt, and
    which composite comprises an anion exchange resin having crystalline $LiX.2Al(OH)_3$ dispersed therein, where x is halide, thereby substantially loading the said composite with $Li^+$ values, the improvement which comprises
    loading the $Li^+$-containing solution with at least one non-competing metal salt prior to passing it through the resin/aluminate.

2. The process of claim 1 wherein the non-competing metal salt is at least one selected from the group consisting of halides of alkali metals and alkaline earth metals.

3. The process of claim 1 wherein the non-competing metal salt is at least one selected from the group consisting of chlorides, bromides, and iodides of sodium, potassium, calcium, and magnesium.

4. The process of claim 1 wherein the non-competing metal salt is predominantly NaCl and/or $CaCl_2$.

5. The process of claim 1 wherein the non-competing metal salt is predominantly NaCl.

6. The process of claim 1 wherein the amount of non-competing metal salt loaded into the $Li^+$-containing solution is an amount which is at least as much as the amount of Li compound in the solution.

7. The process of claim 1 wherein the amount of non-competing metal salt loaded into the $Li^+$ containing solution is an amount sufficient to substantially saturate the solution.

8. The process of claim 1 wherein the Li+ compound in the solution is LiCl, the LiX.2Al(OH)$_3$ is LiCl.2Al(OH)$_3$, and the non-competing metal salt is NaCl.

9. The process of claim 1 wherein the Li+-containing solution is a Li+-containing eluate which has been obtained by passing a salt-rich Li+-containing solution through the resin/aluminate composite, thereby loading the composite with Li+ values, then passing water through the composite to wash out Li+ values to form the Li+-containing eluate.

10. The process of claim 1 wherein the resin/aluminate composite is maintained at a temperature of from about 60° C. to about reflux temperature.

* * * * *